United States Patent
Zhang et al.

(10) Patent No.: US 10,055,118 B2
(45) Date of Patent: Aug. 21, 2018

(54) INFORMATION PROCESSING METHOD AND ELECTRONIC DEVICE

(71) Applicants: Beijing Lenovo Software Ltd., Beijing (CN); Lenovo (Beijing) Co., Ltd., Beijing (CN)

(72) Inventors: Guangjie Zhang, Beijing (CN); Haisheng Dai, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 271 days.

(21) Appl. No.: 14/488,696

(22) Filed: Sep. 17, 2014

(65) Prior Publication Data

US 2015/0277684 A1  Oct. 1, 2015

(30) Foreign Application Priority Data

Mar. 26, 2014 (CN) .......................... 2014 1 0116390

(51) Int. Cl.
*G06F 3/16* (2006.01)
*G06F 3/0482* (2013.01)
(Continued)

(52) U.S. Cl.
CPC ........ *G06F 3/04883* (2013.01); *G06F 3/0482* (2013.01); *G06F 2203/0381* (2013.01)

(58) Field of Classification Search
CPC .................................................. G06F 3/04883
See application file for complete search history.

(56) References Cited

U.S. PATENT DOCUMENTS 6,791,529 B2   9/2004  Shteyn
8,019,389 B2 *  9/2011  Kim ...................... G06F 3/0486
                                            345/173
(Continued)

FOREIGN PATENT DOCUMENTS

CN    1602461 A    3/2005
CN  102695151 A    9/2012
(Continued)

OTHER PUBLICATIONS

First Chinese Office Action regarding Application No. 201410116390.9 dated May 5, 2016. English translation provided by Unitalen Attorneys at Law.

(Continued)

*Primary Examiner* — Jeffrey A Gaffin
*Assistant Examiner* — Nhat Huy T Nguyen
(74) *Attorney, Agent, or Firm* — Harness, Dickey & Pierce, P.L.C.

(57) ABSTRACT

An information processing method and an electronic device are provided. The method is applicable in the electronic device having a display unit. The electronic device is capable of running a voice application. Once the voice application is started, prompt information is displayed in a first display region of the display unit, for directing a user to operate the electronic device in a voice input mode by following the prompt information to implement an operation function corresponding to the prompt information. The method includes: detecting a first operation performed by the user on the first display region in a first operation mode different from the voice operation mode; and in response to the first operation, triggering a first operation instruction and executing the operation function corresponding to the prompt information. Hence, the user may use the function of (Continued)

the electronic device conveniently and the user experience is good.

17 Claims, 6 Drawing Sheets

(51) Int. Cl.
*G06F 3/0484* (2013.01)
*G06F 3/0488* (2013.01)

(56) References Cited

U.S. PATENT DOCUMENTS

| | | | |
|---|---|---|---|
| 2003/0117365 A1 | 6/2003 | Shteyn | |
| 2004/0013243 A1* | 1/2004 | Harris | H04M 1/57 379/67.1 |
| 2010/0162153 A1* | 6/2010 | Lau | G06F 3/0488 715/769 |
| 2010/0241595 A1* | 9/2010 | Felsher | G06F 19/322 705/400 |
| 2012/0036556 A1* | 2/2012 | LeBeau | G06F 3/048 726/3 |
| 2012/0101810 A1* | 4/2012 | Kennewick | G06Q 30/0261 704/9 |
| 2013/0006643 A1* | 1/2013 | Lindahl | G06F 3/167 704/275 |
| 2013/0106904 A1* | 5/2013 | Park | G06F 3/04883 345/619 |
| 2013/0234960 A1* | 9/2013 | Yamamoto | G06F 3/0416 345/173 |
| 2015/0286280 A1* | 10/2015 | Yang | G06F 3/017 345/156 |

FOREIGN PATENT DOCUMENTS

| | | |
|---|---|---|
| CN | 102915221 A | 2/2013 |
| CN | 103269395 A | 8/2013 |
| CN | 203368454 U | 12/2013 |
| CN | 103533135 A | 1/2014 |
| CN | 103632664 A | 3/2014 |

OTHER PUBLICATIONS

Third Chinese Office Action regarding Application No. 201410116390.9 dated Sep. 20, 2017. English translation provided by http://globaldossier.uspto.gov.

* cited by examiner

INFORMATION PROCESSING METHOD AND ELECTRONIC DEVICE

CROSS REFERENCES OF RELATED APPLICATION

The present application claims the priority to Chinese Patent Application No. 201410116390.9, entitled "INFORMATION PROCESSING METHOD AND ELECTRONIC DEVICE", filed on Mar. 26, 2014 with the State Intellectual Property Office of People's Republic of China, which is incorporated herein by reference in its entirety.

FIELD

The disclosure relates to the field of information processing technology, and in particular to an information processing method and an electronic device.

BACKGROUND

At present, an electronic device generally has many functions and correspondingly, there are also many operation instructions corresponding to the functions. When using each function of the electronic device, a user generally needs to perform tedious operations. For example, when making a call, the user enters an address book, then searches for a contact in the address book, and makes the call after the contact is found. The inventors notice by research that the user can not use the function of the electronic device conveniently and the user experience is poor.

SUMMARY

In view of the above, embodiments of the present disclosure provides an information processing method and an electronic device, to alleviate the issues that conventionally the user can not use the function of the electronic device conveniently and the user experience is poor. The technology schemes are as follows.

An information processing method is provided. The method includes:
  detecting a first operation performed by a user on a first display region of a display unit for an electronic device in a first operation mode different from the voice operation mode, where the electronic device is capable of running a voice application, and once the voice application is started, prompt information is displayed in the first display region, the prompt information is used for directing the user to operate the electronic device in the voice input mode by following the prompt information, to implement an operation function corresponding to the prompt information; and
  in response to the first operation, triggering a first operation instruction and executing the operation function corresponding to the prompt information.

An information processing method is provided. The method includes:
  displaying at least two pieces of first information and at least one piece of second information on a display unit of an electronic device, wherein the first information corresponds to an operation function and the second information corresponds to an operation object;
  detecting a first operation performed by a user on at least one piece of the first information and at least one piece of the second information;
  determining, from the first operation, the first and second information chosen by the user; and
  executing an operation function corresponding to the first and second information by using the first information and the second information.

An electronic device including a display unit, a first detection module and a processing module is provided. The electronic device is capable of running a voice application, and once the voice application is started, prompt information is displayed in a first display region of the display unit, for directing a user to operate the electronic device in a voice input mode by following the prompt information to implement an operation function corresponding to the prompt information.

The first detection module is configured to detect a first operation performed by the user on the first display region in a first operation mode different from the voice operation mode; and The processing module is configured to, in response to the first operation, trigger a first operation instruction and execute the operation function corresponding to the prompt information.

An electronic device is provided. The electronic device includes a display unit, a display module, a detection module, a determining module and an executing module;
  the display module is configured to display at least two pieces of first information and at least one piece of second information on the display unit, the first information corresponds to an operation function and the second information corresponds to an operation object;
  the detection module is configured to detect a first operation performed by a user on at least one piece of the first information and at least one piece of the second information;
  the determining module is configured to determine, from the first operation, the first and second information chosen by the user; and
  the executing module is configured to execute an operation function corresponding to the first and second information by using the first information and the second information.

BRIEF DESCRIPTION OF THE DRAWINGS

The appended drawings to be used in the description of the embodiments or the conventional technology will be described briefly as follows, so that the technical solutions according to the embodiments of the present disclosure or according to the conventional technology will become clearer. It is obvious that the appended drawings in the following description only illustrate some embodiments of the present disclosure. For those skilled in the art, other appended drawings may be obtained according to these appended drawings without any creative work.

DETAILED DESCRIPTION

The technical solution according to the embodiments of the present disclosure will be described clearly and completely as follows in conjunction with the appended drawings. It is obvious that the described embodiments are only a few rather than all of the embodiments according to the present disclosure. Any other embodiments obtained by those skilled in the art based on the embodiments in the present disclosure without any creative work fall in the scope of the present disclosure.

Figure 1:
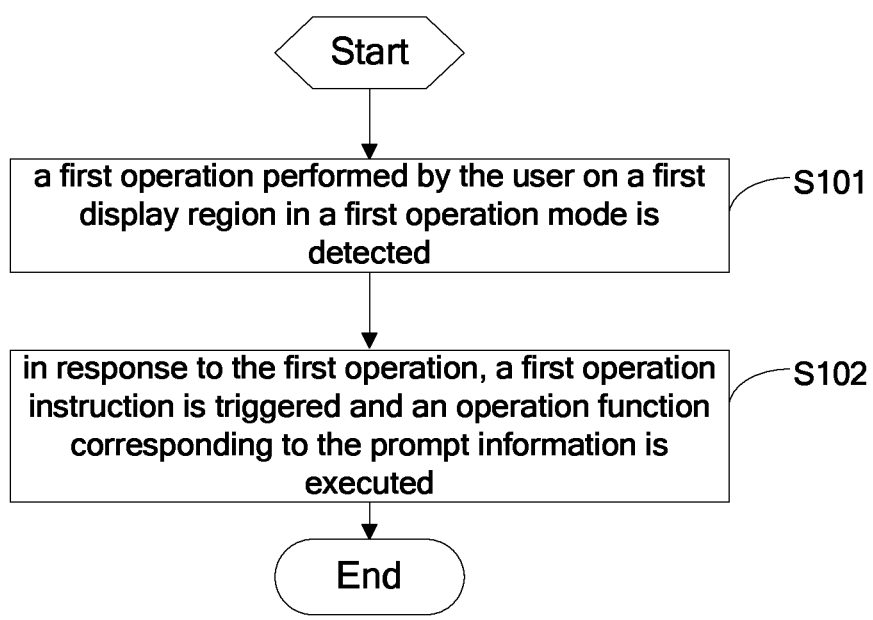
FIG. 1 is a flowchart of an information processing method according to an embodiment of the present disclosure.

The embodiments of the present disclosure provide an information processing method applicable in an electronic device having a display unit. The electronic device may be a desktop, a laptop, a mobile phone, a tablet PC, a smart TV, a smart watch, and the like. The electronic device is capable of running a voice application. Once the voice application is started, prompt information is displayed in a first display region of the display unit, for directing a user to operate the electronic device in a voice input mode by following the prompt information to implement an operation function corresponding to the prompt information. The operation function includes, but not limited to, making phone call, sending short messages, QQ, WeChat, making Video call, and the like. As an example, prompt information of "call" "Zhang San" is displayed on the display unit, and if the user wants to call with voice command, the user may follow the prompt information to perform a voice input, i.e., the user may firstly input a voice segment "call", then pause, and finally input a voice segment "Zhang San". An accuracy of voice recognition may be improved by inputting the voice in accordance with the prompt information. Referring to FIG. 1, a flowchart of an information processing method according to an embodiment of the present disclosure is shown. The method may include steps as follows.

In step s101, a first operation performed by the user on a first display region in a first operation mode is detected.

The first operation mode is different from the voice operation mode.

It should be noted that, in the voice operation mode, the user uses a function of the electronic device by inputting a voice. Different from the case of the voice operation mode, in the first operation mode, the user uses the function of the electronic device by directly operating the prompt information in the first display region, instead of using the function of the electronic device by inputting the voice.

For example, in the case that the prompt information "call" "Zhang San" is displayed on the display unit, the user may call Zhang San with the electronic device by choosing the information "call" and "Zhang San" with a touch operation, where Zhang San is an actual contact.

In step S102, in response to the first operation, a first operation instruction is triggered and an operation function corresponding to the prompt information is executed.

It should be noted that, in the conventional technology, when using a function of the electronic device, the user generally needs to perform tedious operations (for example, when making a call, the user firstly enter an address book, searches for a contact in the address book, and calls after the contact is found). In the embodiment of the present disclosure, the user only needs to operate the prompt information to use the function of the electronic device (for example, the user may call Zhang San with the electronic device by choosing the prompt information "call" and "Zhang San" displayed on the display unit).

In the information processing method according to the embodiment of the present disclosure, the prompt information may be displayed in the first display region of the display unit of the electronic device; the first operation performed by the user on the prompt information in the first display region may be detected after the prompt information is displayed; and then the first operation instruction is triggered and the operation function corresponding to the prompt information is executed. With the information processing method according to the embodiment of the present disclosure, the user may use the function of the electronic device conveniently based on the prompt information displayed in the display unit, and the user experience is good.

Figure 2:
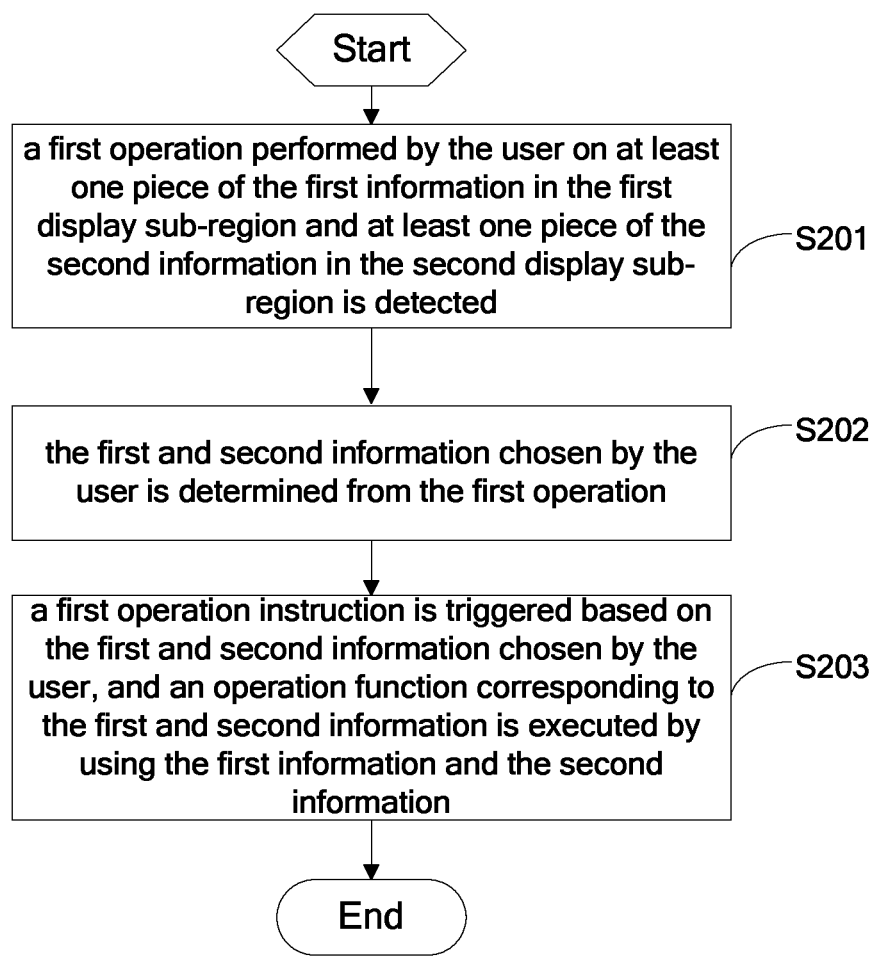
FIG. 2 is another flowchart of an information processing method according to an embodiment of the present disclosure.

It should be noted that, there are many implementations for detecting the first operation performed by the user on the first display region in the first operation mode, and one is shown in FIG. 2. FIG. 2 illustrates another flowchart of an information processing method according to an embodiment of the present disclosure. The method is applicable in an electronic device having a display unit. The electronic device is capable of running a voice application. Once the voice application is started, prompt information is displayed in a first display region of the display unit, for directing a user to operate the electronic device in a voice input mode by following the prompt information to implement an operation function corresponding to the prompt information. The operation function includes, but not limited to, making phone call, sending short messages, QQ, WeChat, making video call, and the like. Specifically, the first display region includes a first display sub-region and a second display sub-region. The prompt information includes at least two pieces of first information and at least one piece of second information. The first information is located in the first display sub-region and the second information is located in the second display sub-region. The method may include steps as follows.

In step S201, a first operation performed by the user on at least one piece of the first information in the first display sub-region and at least one piece of the second information in the second display sub-region is detected.

The first information corresponds to an operation function, and the second information corresponds to an operation object. For example, the first information is "call" and the second information is "Zhang San".

Figure 3:
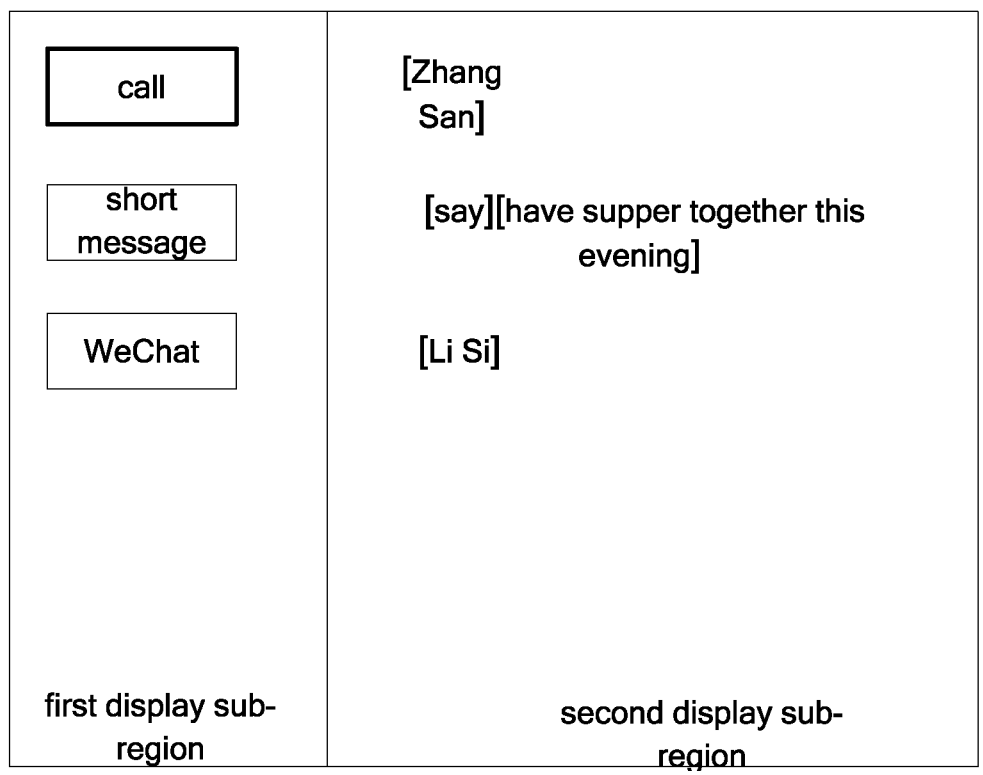
FIG. 3 is a schematic diagram of a display mode for displaying first information and second information on a display unit in an information processing method according to an embodiment of the present disclosure.

Referring to FIG. 3, a schematic diagram in which the first information and the second information are displayed in the first display region of the display unit is illustrated. The user may operate the first information and the second information as shown in FIG. 3.

In step S202, the first and second information chosen by the user is determined from the first operation.

In a possible implementation, the display unit of the electronic device is a touch display screen. The first operation is a touch operation having two touch points. Information corresponding to one of the touch points for the touch operation is the first information and information corresponding to the other touch point for the touch operation is the second information.

In another possible implementation, the display unit of the electronic device is a touch display screen. The first operation is a slide-touch operation. Information corresponding to a start point of the slide-touch operation is the first information and information corresponding to an end point of the slide-touch operation is the second information; or, the information corresponding to the start point of the slide-touch operation is the second information and the information corresponding to the end point of the slide touch operation is the first information.

In step S203, a first operation instruction is triggered based on the first and second information chosen by the user, and an operation function corresponding to the first and second information is executed by using the first information and the second information.

For example, in the case that the user wants to call Zhang San, in a possible implementation, the user presses "call" in the first display sub-region shown in FIG. 3 with a middle finger, and at the same time presses "Zhang San" in the second display sub-region with a forefinger, then a phone call is made with the electronic device to Zhang San; in another possible implementation, the user drags "Zhang San" in the second display sub-region to "call" in the first display sub-region, then the phone call is made with the electronic device to Zhang San; in yet another possible implementation, the user drags "call" in the first display sub-region to "Zhang San" in the second display sub-region, then the phone call is made with the electronic device to Zhang San.

Figure 4:
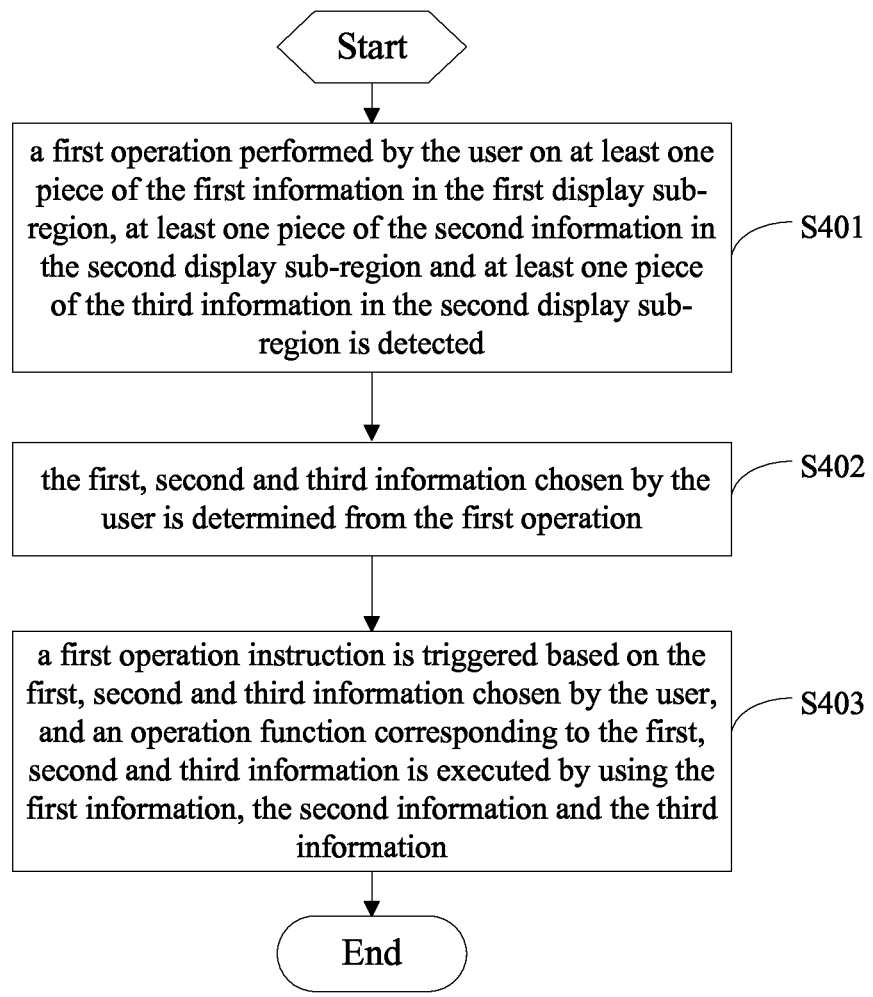
FIG. 4 is another flowchart of an information processing method according to an embodiment of the present disclosure.

Another implementation for detecting the first operation performed by the user on the first display region in the first operation mode is shown in FIG. 4. FIG. 4 is another flowchart of an information processing method according to an embodiment of the present disclosure. The method is applicable in an electronic device having a display unit. The electronic device is capable of running a voice application. Once the voice application is started, prompt information is displayed in a first display region of the display unit, for directing a user to operate the electronic device in a voice input mode by following the prompt information to implement an operation function corresponding to the prompt information. The operation function includes, but not limited to, making phone call, sending short messages, QQ, WeChat, making video call, and the like. Specifically, the first display region includes a first display sub-region and a second display sub-region. The prompt information includes at least two pieces of first information, at least one piece of second information and at least one piece of third information. The first information is located in the first display sub-region, the second information and the third information are located in the second sub-region. The method may include steps as follows.

In step S401, a first operation performed by the user on at least one piece of the first information in the first display sub-region, at least one piece of the second information in the second display sub-region and at least one piece of the third information in the second display sub-region is detected.

The first information corresponds to the operation function, the second information corresponds to an operation object and the third information corresponds to an operation content. For example, the first information is "sending a short message", the second information is "Zhang San" and the third information is a message content such as "have supper together this evening".

In step S402, the first, second and third information chosen by the user is determined from the first operation.

In a possible implementation, the display unit of the electronic device is a touch display screen, and the first operation is a touch operation having multiple touch points.

For example, the first operation is the touch operation with three touch points. Information corresponding to a first touch point in the touch operation is the first information, information corresponding to a second touch point in the touch operation is the second information, and information corresponding to a third touch point in the touch operation is the operation content.

In another possible implementation, the display unit of the electronic device is a touch display screen, and the first operation is a slide-touch operation. Information corresponding to a start point of the slide-touch operation includes the second information and the third information, and information corresponding to an end point of the slide-touch operation is the first information.

In step S403, a first operation instruction is triggered based on the first, second and third information chosen by the user, and an operation function corresponding to the first, second and third information is executed by using the first information, the second information and the third information.

For example, in the case that the user wants to tell Zhang San "have supper together this evening" by sending a short message, in a possible implementation, the user may press "short message" in the first display sub-region, "Zhang San" in the second display sub-region and "have supper together this evening" in the second display sub-region with three fingers respectively, then the electronic device may send a short message to Zhang San and the content of the short message is "have supper together this evening". In another possible implementation, the user drags "Zhang San" and "have supper together this evening" in the second display sub-region to "short message" in the first display sub-region, then the electronic device may send a short message to Zhang San, and the content of the short message is "have supper together this evening".

In the information processing method according to the embodiments of the present disclosure, the prompt information may be displayed in the first display region of the display unit of the electronic device; the first operation, which is performed by the user on the first information in the first display sub-region and the second information in the second display sub-region, may be detected after the prompt information is displayed; and then the first operation instruction is triggered and an operation function corresponding to the prompt information is executed. With the information processing method and electronic device according to the embodiments of the present disclosure, the user may use the function of the electronic device conveniently based on the prompt information displayed in the display unit, and the user experience is good.

It should be noted that, in some cases, the user may need to adjust the position of the prompt information displayed in the display region to meet a use requirement of the user. From this concern, the information processing method according to the embodiment shown in FIG. 2 or the embodiment shown in FIG. 4 may further includes:

detecting a second operation performed by the user on the first display region; determining, from the second operation, at least two pieces of information chosen by the user; and adjusting display positions of the at least two pieces of information.

Specifically, the at least two pieces of information are at least two pieces of first information or at least two pieces of the second information. For example, positions of "call" and "short message" in the first display sub-region may be exchanged, positions of "Zhang San" and "Li Si" in the second display sub-region may be exchanged, or the like.

It should be noted that, in a possible implementation, the steps of "detecting a second operation performed by the user on the first display region; determining, from the second operation, at least two pieces of information chosen by the user; and adjusting display positions of the at least two pieces of information" may be performed before step S201 or S401. In other words, the user adjusts the display position of the prompt information firstly, and then performs the first operation. Therefore, the user may manually adjust the position of the prompt information on a reminding interface, to form a page layout meeting his personal requirement, and the user experience is improved.

In another possible implementation, the steps of "detecting a second operation performed by the user on the first display region; determining, from the second operation, at least two pieces of information chosen by the user; and adjusting display positions of the at least two pieces of information" may be performed after step S201 or S401. In other words, the second operation is performed after the first operation of the user. The second operation may be for exchanging operation functions or exchanging operation objects. For example, in a possible case, the user perform the first operation on "call" in the first display sub-region and "Zhang San" in the second display sub-region to call Zhang san with the electronic device; after the first operation, the first display sub-region and the second display sub-region are still remained on the display unit, and the user performs the second operation on "call" and "short message" (exchanging "call" and "short message") in the first display sub-region to send a short message to Zhang San with the electronic device. In another possible case, the user performs the first operation on "call" in the first display sub-region and "Zhang San" in the second display sub-region to call Zhang san with the electronic device; after the first operation, the user performs the second operation on "Zhang San" and "Li Si" (exchanging "Zhang San" and "Li Si") in the second display sub-region, then the electronic device hangs up the call to "Zhang San" and calls Li Si. Therefore, when the user calls and the call is not answered after a long time, the user may quickly switches to another communication mode such as short message or quickly switches the contact, with only one operation, thus the user experience is improved.

Specifically, the second operation may be a touch operation with at least two touch points. Information corresponding to the at least two touch points in the touch operation with the at least two touch points includes at least two pieces of information. For example, the user presses "call" and "short message" respectively with two fingers, then the electronic device may exchange the positions of "call" and "short message".

It may be understood that, generally, the electronic device has many functions, and among the functions only some are frequently used by the user. For example, functions such as calling and sending short message are frequently used by the user. In view of this, in order to adapt to the user habit, the information processing method according to the embodiment of FIG. 2 or FIG. 4 may further include:

determining, from historical operation information, prompt information meeting a first preset condition, and displaying the prompt information meeting the first preset condition.

In a possible implementation, the step of determining, from the history operation information, the prompt information meeting the first preset condition and displaying the prompt information meeting the first preset condition may include: determining, according to the history operation information, the prompt information which has been used for more than a first preset number of times, and displaying the prompt information. Hence, a communication mode or a contact that is used most frequently by the user is displayed in the first display region and it is convenient for the user to choose.

In another possible implementation, the step of determining, from the history operation information, the prompt information meeting the first preset condition and displaying the prompt information meeting the first preset condition may include: counting from the history operation information, the number of times each piece of prompt information is used, ordering the pieces of prompt information according to the number of usage times (in descending order), and displaying the pieces of prompt information which are ranked ahead of N-th (N is an integer larger than or equal to 2). Hence a communication mode or a contact that the user uses most often is displayed in the first display region and it is convenient for the user to choose.

It should be noted that, the electronic device generally has some new functions which is not often used or never used by the user. In order to remind the user to find and use the new functions of the electronic device, the information processing method according to the embodiment of FIG. 2 or FIG. 4 may further include:

displaying the first information (the first information corresponds to an operation function) meeting a second preset condition.

In a possible implementation, the displaying the first information meeting the second preset condition may include: determining, from the history operation information, the first information which has been used for less than a second preset number of times, and displaying the first information. Hence, the functions that the user uses rarely are recommended to the user (by displaying the functions in the first region), and the user can use these functions.

In another possible implementation, the displaying the first information meeting the second preset condition may include: counting from the history operation information, the number of times each piece of first information is used, ordering the pieces of first information according to the number of usage times (in ascending order), and displaying the piece of first information which are ranked ahead of M-th (M is an integer larger than or equal to 2). Hence, the functions that the user uses rarely are recommended to the user (by displaying the functions in the first region), and the user can use these functions.

In yet another possible implementation, the displaying the first information meeting the second preset condition may include: displaying the never used first information. Hence, the newly emerged functions in the electronic device or the functions overlooked by the user are recommended to the user (by displaying the functions in the first region), and the user can notice and use these functions.

The first information meeting the second preset condition is displayed, so that new functions, functions the user uses rarely or functions overlooked by the user in the electronic device are recommended to the user (by displaying the functions in the first region), hence the user can find and use the functions.

It should be understood that, different operation functions may correspond to different operation objects. For example, a contact in a phone call may be different from a contact in WeChat. In view of this, the information processing method according to the embodiment of FIG. 2 or FIG. 4 may further includes:

updating the second information in the second display sub-region based on the operation performed by the user on the first information in the first display sub-region.

For example, if the user clicks "call" in the first display sub-region in FIG. 3, a contact corresponding to the call is displayed in the second display sub-region. If the user clicks "short message" in the first display sub-region in FIG. 3, information displayed in the second display sub-region is updated to be a contact corresponding to the short message.

Hence, when the user chooses a certain function, a communication mode or a contact corresponding to the function may be displayed in the first display region, and it is convenient for the user to choose.

Figure 5:
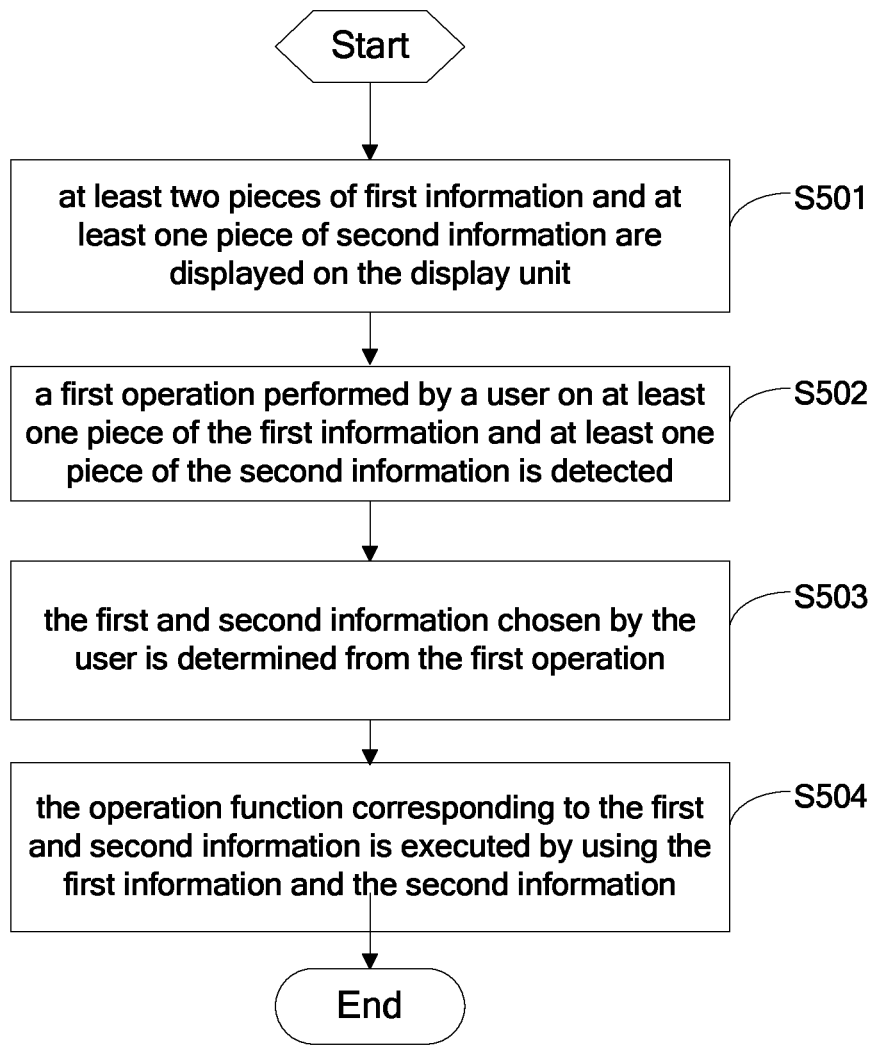
FIG. 5 is another flowchart of an information processing method according to an embodiment of the present disclosure.

Referring to FIG. 5, a flowchart of another information processing method according to an embodiment of the present disclosure is shown. The method is applicable in an electronic device having a display unit, the electronic device may be a desktop, a laptop, a mobile phone, a tablet PC, a smart phone, a smart watch, and the like. The method includes steps as follows.

In step S501, at least two pieces of first information and at least one piece of second information are displayed on the display unit.

The first information corresponds to an operation function and the second information corresponds to an operation object.

It should be noted that, the method according to the embodiment is not limited to be applied to a voice application. In other words, the prompt information is not limited to be displayed in a voice interface and may be displayed in interfaces of various applications. For example, the prompt information may be displayed in an interface of short message application, an interface of WeChat, and the like. And the prompt information may be also displayed in a main interface of the electronic device.

In step S502, a first operation performed by a user on at least one piece of the first information and at least one piece of the second information is detected.

The first information corresponds to the operation function, and the second information corresponds to the operation object. For example, the first information is "call" and the second information is "Zhang San".

In step S503, the first and second information chosen by the user is determined from the first operation.

In a possible implementation, the display unit of the electronic device is a touch display screen. The first operation is a touch operation having two touch points. Information corresponding to one of the touch points in the touch operation is the first information and information corresponding to the other touch point in the touch operation is the second information.

In another possible implementation, the display unit of the electronic device is a touch display screen. The first operation is a slide-touch operation. Information corresponding to a start point of the slide-touch operation is the first information and information corresponding to an end point of the slide-touch operation is the second information. Or, the information corresponding to the start point of the slide-touch operation is the second information and the information corresponding to the end point of the slide touch operation is the first information.

In step S504, the operation function corresponding to the first and second information is executed by using the first information and the second information.

Moreover, it should be noted that the information displayed on the display unit may further include a third information in addition to the first information and the second information, and the third information corresponds to an operation content. In this case, the first operation is an operation performed by the user on at least one piece of the first information, at least one piece of the second information and at least one piece of the third information. The electronic device determines, from the first operation, the first information, the second information and the third information, and then executes the operation function corresponding to the first information, the second information and the third information by using the first information, the second information and the third information.

Optionally, the information processing method according to the embodiment of the present disclosure may further include: detecting a second operation performed by the user; determining, from the second operation, at least two pieces of information chosen by the user; and adjusting display positions of the at least two pieces of information. Therefore, the user may manually adjust the position of the prompt information on a reminding interface to form a page layout meeting his personal requirement, and the user experience is improved. Specifically, the at least two pieces of information may be at least two pieces of first information, at least two pieces of the second information, or at least two pieces of the third information.

Optionally, the information processing method according to the embodiment may further include: determining prompt information meeting a first preset condition (the number of usage times is larger than a first preset number of times; or the prompt information is ranked ahead of N-th according to the number of usage times in descending order) and displaying the prompt information meeting the first preset condition. Hence a communication mode or a contact that the user uses most often is displayed in the first display region and it is convenient for the user to choose.

Optionally, the information processing method according to the embodiment of the present disclosure may further includes: displaying first information (the first information corresponds to an operation function) meeting a second preset condition (the number of usage times is less than a second preset number of times, or the first information is ranked ahead of M-th according to the number of usage times in ascending order). Hence, the newly emerged functions in the electronic device or the functions overlooked by the user are recommended to the user (by displaying the functions in the first region), the user may notice and use these functions.

Optionally, the information processing method according to the embodiment of the present disclosure may further include: updating the second information based on the operation performed by the user on the first information. In other words, when the user chooses a certain function, a communication mode or a contact corresponding to the function may be displayed in the first display region, and it is convenient for the user to choose.

It should be noted that, the specific implementation of each step in the embodiment of the present disclosure is not described herein, and one may refer to the above embodiments.

In the information processing method according to the embodiment of the present disclosure, the prompt information may be displayed in the display unit of the electronic device; the first operation performed by the user on the prompt information may be detected after the prompt information is displayed; thus a first operation instruction is triggered and the operation function corresponding to the prompt information is executed. With the information processing method according to the embodiment of the present disclosure, the user may use the function of the electronic device conveniently based on the prompt information displayed in the display unit, and the user experience is good.

Figure 6:
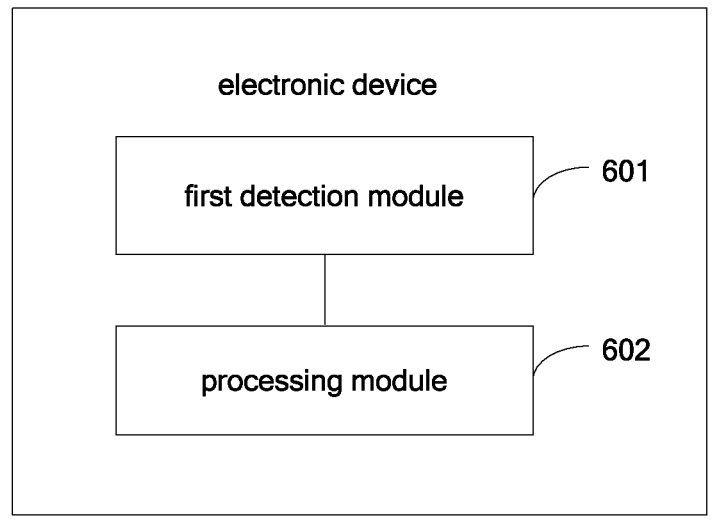
FIG. 6 is a schematic structural diagram of an electronic device according to an electronic device.

Corresponding to the methods, an embodiment of the present disclosure further provides an electronic device. Referring to FIG. 6, a schematic structural diagram of an electronic device according to the embodiment of the present disclosure is shown. The electronic device has a display unit and is capable of running a voice application. Once the voice application is started, prompt information is displayed in a first display region of the display unit, for directing a user to operate the electronic device in a voice input mode by following the prompt information to implement an operation function corresponding to the prompt information. The electronic device may include a first detection module 601 and a processing module 602.

The first detection module 601 is configured to detect a first operation performed by the user on the first display region in a first operation mode different from the voice operation mode.

The processing module 602 is configured to, in response to the first operation, trigger a first operation instruction and execute the operation function corresponding to the prompt information.

In the electronic device according to the embodiment of the present disclosure, the prompt information may be displayed in the first display region of the display unit; the first operation performed by the user on the prompt information in the first display region may be detected after the prompt information is displayed; thus a first operation instruction is triggered and the operation function corresponding to the prompt information is executed. With the electronic device according to the embodiment of the present disclosure, the user may use the function of the electronic device conveniently based on the prompt information displayed in the display unit, and the user experience is good.

In a possible implementation, the prompt information displayed on the display unit of the electronic device according to the above embodiment includes at least two pieces of first information and at least one piece of second information, the first information is located in the first display sub-region and corresponds to an operation function, and the second information is located in a second display sub-region and corresponds to an operation object. The first detection module 601 includes a first detection sub-module, and the processing module 602 includes a first determining sub-module and a first executing sub-module.

The first detection sub-module is configured to detect a first operation performed by the user on at least one piece of the first information in the first display sub-region and at least one piece of the second information in the second display sub-region.

In a possible implementation, the first operation is a touch operation with at least two touch points. Information corresponding to one of the touch points in the touch operation is the first information and information corresponding to the other touch point in the touch operation is the second information.

In another possible implementation, the first operation is a slide-touch operation. Information corresponding to a start point of the slide-touch operation is the first information and information corresponding to an end point of the slide-touch operation is the second information. Or the information corresponding to the start point of the slide-touch operation is the second information and the information corresponding to the end point of the slide touch operation is the first information.

The first determining sub-module is configured to determine, from the first operation, the first and second information chosen by the user.

The first executing sub-module is configured to trigger the first operation instruction based on the first and second information chosen by the user, and execute an operation function corresponding to the first and second information by using the first information and the second information.

In a possible implementation, the prompt information displayed on the display unit of the electronic device in the above embodiment includes at least two pieces of first information, at least one piece of second information and at least one piece of third information. The first information is located in the first display sub-region and corresponds to an operation function, the second information is located in the second display sub-region and corresponds to an operation object, and the third information is located in the second display sub-region and corresponds to an operation content. The first detection module 601 includes a second detection sub-module, and the processing module 602 includes a second determining sub-module and a second executing sub-module.

The second detection sub-module is configured to detect a first operation performed by the user on at least one piece of the first information in the first display sub-region, at least one piece of the second information in the second display sub-region, and at least one piece of the third information in the second display sub-region;

the second determining sub-module is configured to determine, from the first operation, the first, second and third information chosen by the user; and the second executing sub-module is configured to trigger the first operation instruction based on the first, second and third information chosen by the user, and execute an operation function corresponding to the first, second and third information by using the first information, the second information and the third information.

Optionally, the electronic device according to the above embodiment may further include a second detection module, a determining module and an adjusting module.

The second detection module is configured to detect a second operation performed by the user on the first display region.

The second operation may be a touch operation with at least two touch points, and information corresponding to the at least two touch points in the touch operation includes at least two pieces of information.

The determining module is configured to determine, from the second operation, at least two pieces of information chosen by the user, the at least two pieces of information are at least two pieces of the first information, at least two pieces of the second information or at least two pieces of the third information.

The adjusting module is configured to adjust display positions of the at least two pieces of information.

Optionally, the electronic device according to the above embodiment may further include a first display module. The first display module is configured to determine, from historical operation information, prompt information meeting a first preset condition, and display the prompt information meeting the first preset condition.

Optionally, the electronic device according to the above embodiment may further include a second display module configured to display first information meeting a second preset condition.

Optionally, the electronic device according to the above embodiment may further include an information updating module. The information updating module is configured to update the second information in the second display sub-region based on the operation performed by the user on the first information in the first display sub-region.

Figure 7:
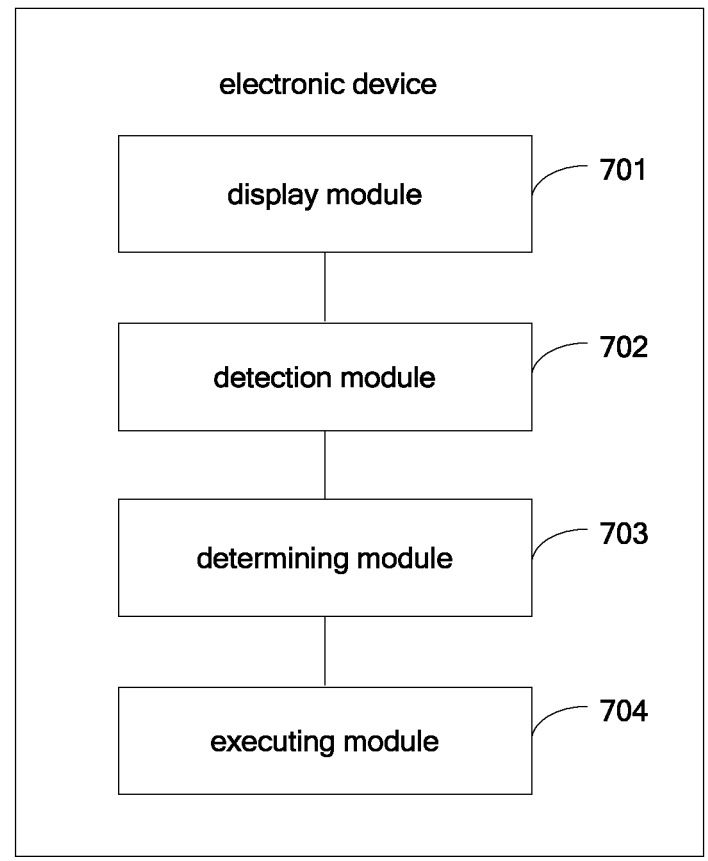
FIG. 7 is another schematic structural diagram of an electronic device according to an electronic device.

Referring to FIG. 7, a schematic structural diagram of an electronic device according to an embodiment of the present disclosure is shown. The electronic device has a display unit and is capable of running a voice application. Once the voice application is started, prompt information is displayed in a first display region of the display unit, for directing a user to operate the electronic device in a voice input mode by following the prompt information to implement an operation function corresponding to the prompt information. The electronic device may include a display module 701, a detection module 702, a determining module 703 and an executing module 704.

The display module 701 is configured to display at least two pieces of first information and at least one piece of second information on the display unit.

The first information corresponds to an operation function and the second information corresponds to an operation object.

The detection module 702 is configured to detect a first operation performed by a user on at least one piece of the first information and at least one piece of the second information.

The determining module 703 is configured to determine, from the first operation, the first and second information chosen by the user.

The executing module 704 is configured to execute an operation function corresponding to the first and second information by using the first information and the second information.

In the electronic device according to the embodiment of the present disclosure, the prompt information may be displayed in the display unit; the first operation performed by the user on the prompt information may be detected after the prompt information is displayed; thus a first operation instruction is triggered and the operation function corresponding to the prompt information is executed. With the electronic device according to the embodiment of the present disclosure, the user may use the function of the electronic device conveniently based on the prompt information displayed in the display unit, and the user experience is good.

It should be noted that, the embodiments in this specification are described in a progressive way, each of which emphasizes the differences from others, and the same or similar parts among the embodiments can be referred to each other. Since the device or system disclosed in the embodiments corresponds to the method therein, the description thereof is relatively simple, and for relevant matters references may be made to the description of the method.

It should be further noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

The steps of the exemplary methods or algorithms can be implemented with hardware, software modules executed by a processor, or a combination thereof. The software modules may reside in a Random Access Memory (RAM), an internal memory, a Read Only Memory (ROM), an Electrically Programmable ROM, an Electrically-Erasable Programmable ROM, a register, a hard disk, a removable disk drive, CD-ROM, or other types of storage media well known in the field.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. An information processing method comprising:
   displaying prompt information in a first display region of a display unit for an electronic device when a voice application of the electronic device is started, wherein the prompt information is used for directing a user to operate the electronic device in a voice input mode by following the prompt information, to implement an operation function corresponding to the prompt information;
   detecting a first operation performed by the user on the first display region in a first operation mode different from a voice operation mode;
   in response to the first operation, triggering a first operation instruction and executing the operation function corresponding to the prompt information,
   wherein the prompt information comprises at least two pieces of first information, at least one piece of second information and at least one piece of third information;
   the first information is located in a first display sub-region and corresponds to the operation function, the second information is located in a second display sub-region and corresponds to an operation object, and the third information is located in the second display sub-region and corresponds to an operation content related to the operation object; and
   detecting the first operation performed by the user on the first display region in the first operation mode comprises:
      detecting the first operation performed by the user on at least one piece of the first information in the first display sub-region, at least one piece of the second information in the second display sub-region, and at least one piece of the third information in the second display sub-region,
      wherein the method further comprises:
         displaying the first information which has been used for less than a preset number of times according to history operation information.

2. The method according to claim 1, wherein
in response to the first operation triggering the first operation instruction and executing the operation function corresponding to the prompt information, comprises:
determining, from the first operation, the first, second and third information chosen by the user; and
triggering the first operation instruction based on the first, second and third information chosen by the user, and executing the operation function corresponding to the first, second and third information by using the first information, the second information and the third information.

3. The method according to claim 2, further comprising:
detecting a second operation performed by the user on the first display region;
determining, from the second operation, at least two pieces of information chosen by the user, wherein the at least two pieces of information are at least two pieces of the first information, at least two pieces of the second information or at least two pieces of the third information; and
adjusting display positions of the at least two pieces of information.

4. The method according to claim 1, further comprising:
determining, from historical operation information, prompt information meeting a first preset condition, and displaying the prompt information meeting the first preset condition.

5. The method according to claim 1, further comprising:
displaying the first information meeting a second preset condition.

6. The method according to claim 1, further comprising:
updating the second information in the second display sub-region based on the first operation performed by the user on the first information in the first display sub-region.

7. The method according to claim 1, wherein the first operation is a touch operation having at least two touch points, information corresponding to one of the touch points in the touch operation is the first information and information corresponding to the other touch point in the touch operation is the second information;
or
the first operation is a slide-touch operation, information corresponding to a start point of the slide-touch operation is the first information and information corresponding to an end point of the slide-touch operation is the second information; or, the information corresponding to the start point of the slide-touch operation is the second information and the information corresponding to the end point of the slide-touch operation is the first information.

8. The method according to claim 3, wherein the second operation is a touch operation having at least two touch points; and
the two pieces of information are information corresponding to the at least two touch points in the touch operation.

9. An information processing method comprising:
displaying at least two pieces of first information, at least one piece of second information and at least one piece of third information on a display unit of an electronic device, when a voice application of the electronic device is started, wherein the first information is located in a first display sub-region and corresponds to an operation function, the second information is located in a second display sub-region and corresponds to an operation object, and the third information is located in the second display sub-region and corresponds to an operation content related to the operation object, and wherein the first information, the second information and the third information are used for directing a user to operate the electronic device in a voice input mode by following the first information, the second information and the third information, to implement the operation function corresponding to prompt information;
detecting a first operation performed by the user on at least one piece of the first information, at least one piece of the second information and at least one piece of the third information;
determining, from the first operation, the first, second, and third information chosen by the user; and
executing the operation function corresponding to the first, second, and third information by using the first information, the second information, and the third information,
wherein the method further comprises:
displaying the first information which has been used for less than a preset number of times according to history operation information.

10. An electronic device comprising a display unit, a processor, and a memory storing program, wherein:
the processor performs stored program codes to:
display prompt information in a first display region of the display unit when a voice application of the electronic device is started, wherein the prompt information is used for directing a user to operate the electronic device in a voice input mode by following the prompt information, to implement an operation function corresponding to the prompt information;
detect a first operation performed by the user on the first display region in a first operation mode different from a voice operation mode; and
in response to the first operation, trigger a first operation instruction and execute the operation function corresponding to the prompt information,
wherein the prompt information comprises at least two pieces of first information, at least one piece of second information and at least one piece of third information; the first information is located in a first display sub-region and corresponds to the operation function, the second information is located in a second display sub-region and corresponds to an operation object, and the third information is located in the second display sub-region and corresponds to an operation content related to the operation object; and
the processor further performs the stored program codes to:
detect the first operation performed by the user on at least one piece of the first information in the first display sub-region, at least one piece of the second information in the second display sub-region, and at least one piece of the third information in the second display sub-region,
wherein the processor further performs the stored program codes to:
display the first information which has been used for less than a preset number of times according to history operation information.

11. The electronic device according to claim 10, wherein the processor further performs the stored program codes to:

determine, from the first operation, the first, second and third information chosen by the user; and trigger the first operation instruction based on the first, second and third information chosen by the user, and execute the operation function corresponding to the first, second and third information by using the first information, the second information and the third information.

12. The electronic device according to claim 11, wherein the processor further performs the stored program codes to:

detect a second operation performed by the user on the first display region;

determine, from the second operation, at least two pieces of information chosen by the user, the at least two pieces of information are at least two pieces of the first information, at least two pieces of the second information or at least two pieces of the third information; and adjust display positions of the at least two pieces of information.

13. The electronic device according to claim 10, wherein the processor further performs the stored program codes to:

determine, from historical operation information, prompt information meeting a first preset condition, and display the prompt information meeting the first preset condition.

14. The electronic device according to claim 10, wherein the processor further performs the stored program codes to:

display the first information meeting a second preset condition.

15. The electronic device according to claim 10, wherein the processor further performs the stored program codes to:

update the second information in the second display sub-region based on the first operation performed by the user on the first information in the first display sub-region.

16. The electronic device according to claim 10, wherein the first operation is a touch operation having at least two touch points, information corresponding to one of the touch points in the touch operation is the first information and information corresponding to the other touch point in the touch operation is the second information;

or the first operation is a slide-touch operation, information corresponding to a start point of the slide-touch operation is the first information and information corresponding to an end point of the slide-touch operation is the second information; or the information corresponding to the start point of the slide-touch operation is the second information and the information corresponding to the end point of the slide-touch operation is the first information.

17. The electronic device according to claim 12, wherein the second operation is a touch operation having at least two touch points; and the two pieces of information are information corresponding to the at least two touch points in the touch operation.

* * * * *